US010889156B2

(12) United States Patent
Montboeuf et al.

(10) Patent No.: US 10,889,156 B2
(45) Date of Patent: Jan. 12, 2021

(54) SUSPENSION BEARING UNIT AND SUPPORT STRUT EQUIPPED WITH SUCH A UNIT

(71) Applicant: Aktiebolaget SKF, Gothenburg (SE)

(72) Inventors: Bruno Montboeuf, Saint-Cyr-sur-Loire (FR); Charles Bedeau, Tours (FR); Francois De Lemps, Saint-Cyr-sur-Loire (FR)

(73) Assignee: Aktiebolaget SKF, Gothenburg (SE)

( * ) Notice: Subject to any disclaimer, the term of this patent is extended or adjusted under 35 U.S.C. 154(b) by 85 days.

(21) Appl. No.: 16/113,161

(22) Filed: Aug. 27, 2018

(65) Prior Publication Data
US 2019/0184781 A1    Jun. 20, 2019

(30) Foreign Application Priority Data

Dec. 20, 2017   (FR) ...................................... 17 62592

(51) Int. Cl.
*F16C 19/10*   (2006.01)
*B60G 11/56*   (2006.01)
*F16C 33/76*   (2006.01)
*B60G 15/06*   (2006.01)
*F16C 33/78*   (2006.01)

(52) U.S. Cl.
CPC ............ *B60G 11/56* (2013.01); *B60G 15/068* (2013.01); *F16C 19/10* (2013.01); *F16C 33/761* (2013.01); *F16C 33/7886* (2013.01); *B60G 2204/128* (2013.01); *B60G 2204/41* (2013.01); *B60G 2204/418* (2013.01); *B60G 2206/7104* (2013.01); *F16C 2326/05* (2013.01)

(58) Field of Classification Search
CPC .... F16C 19/10; F16C 33/761; F16C 33/7886; F16C 2326/05; B60G 15/068; B60G 15/2204; B60G 15/418
See application file for complete search history.

(56) References Cited

U.S. PATENT DOCUMENTS

| 8,496,235 | B2 * | 7/2013 | Viault ..................... F16C 19/10 |
| | | | 267/220 |
| 9,248,715 | B2 * | 2/2016 | Bussit .................. B60G 13/003 |
| 2013/0303766 | A1 * | 11/2013 | Ha ........................ C07F 7/1804 |
| | | | 546/14 |
| 2016/0223023 | A1 | 8/2016 | Lee |

FOREIGN PATENT DOCUMENTS

| EP | 1555144 A2 | 7/2005 | |
| FR | 2989634 A1 | 10/2013 | |
| FR | 2990252 A1 | 11/2013 | |
| FR | 3001513 A1 | 8/2014 | |
| WO | WO-2008081122 A2 * | 7/2008 | ............ F16C 33/761 |
| WO | 2010/034734 A1 | 4/2010 | |

* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A suspension bearing unit for a motor vehicle, comprising an upper cup, a lower cup and a bearing interposed between the upper cup and the lower cup in rotation in relation to each other about a principal axis. The suspension bearing unit also comprises at least one seal in a hollow housing provided on one face of a first element from among the lower cup and the upper cup. The hollow housing comprises a plurality of protruding ribs spaced apart circumferentially, the ribs protruding into the base of the seal.

9 Claims, 2 Drawing Sheets

SUSPENSION BEARING UNIT AND SUPPORT STRUT EQUIPPED WITH SUCH A UNIT

CROSS-REFERENCE

This application claims priority to French patent application no. 1762592 filed on Dec. 20, 2017, the contents of which are fully incorporated herein by reference.

TECHNOLOGICAL FIELD

The present invention relates to a suspension bearing unit, in particular of the MacPherson type ("MacPherson Suspension Bearing Unit" or "MSBU"). The invention also relates to a support strut for a motor vehicle, comprising a shock absorber and a suchlike suspension bearing unit. The field of the invention is that of suspension systems, in particular automobile suspension systems.

BACKGROUND

In a manner known per se, an automobile suspension system comprises a support strut supporting an axle and a wheel of a vehicle. A suspension bearing unit is disposed in the upper part of the support strut, opposite the wheel and the ground, between a suspension spring and an upper member that is integral with the body shell of the vehicle. The spring is disposed about a shock absorber piston rod, of which the extremity may be connected to the body shell of the vehicle.

BRIEF SUMMARY OF THE PRESENT INVENTION

The suspension bearing unit comprises a bearing, a lower cup, an upper cup and at least one seal disposed between the cups. The different constituent elements of the suspension bearing unit may be molded in a plastic material, the cups possibly being reinforced by rigid inserts, in particular made of metal, in order to increase their mechanical strength. The upper cup is interposed between an upper ring of the bearing and the upper member, while the lower cup is interposed between a lower ring of the bearing and the suspension spring. Thus, the suspension bearing unit is adapted to transmit axial forces between the suspension spring and the body shell of the vehicle, while allowing a relative angular movement between the rings of the bearing.

A suchlike suspension bearing unit, in particular of the MSBU type, is expected to be implemented in an aggressive environment. The vehicle is likely to be driven on a flooded, dusty or muddy road, for example, and then to be cleaned with a jet of water at high pressure. Under these conditions, the ingress of water or other solid polluting particles may occur in the suspension bearing unit, in particular in the bearing, with adverse consequences on their respective service life and performance. The seal or the seals that are integrated into the suspension bearing unit are provided in order to prevent ingress into the suspension bearing unit.

Document FR-A1-2 989 634 describes in particular a suspension bearing unit equipped with a particularly effective seal. The seal is made of a thermoplastic material, molded on a lower cup of the suspension bearing unit. The seal is provided with an essentially annular base having a cylindrical internal face and a radial annular surface imparting an essentially parallepipedal axial cross-sectional form to the base adapted to be received in a hollow housing provided on one external face of the lower cup. The seal is also provided with two essentially annular sealing lips extending from the annular base in order to come into contact with a portion of the upper cup, each being provided with a preformed elbow enabling satisfactory sealing to be retained while maintaining constant contact with the other cup.

However, the chemical bond achieved between the seal and the lower cup by molding may not be sufficient to ensure the maintenance of the seal, in particular in the case of high relative displacement between the two cups. The upper cup would then cause the sealing lips to deform heavily and, as a result, the base of the seal, giving rise to tensions capable of leading to localized disengagement between the seal and the lower cup.

The aim of the present invention is to propose an improved suspension bearing unit intended to address this disadvantage.

For this purpose, the invention relates to a suspension bearing unit for a motor vehicle, comprising an upper cup intended to be installed in an upper member integral with the body shell of the vehicle, and a lower cup intended to form a supporting means for a suspension spring. The upper cup and the lower cup are rotatably mounted in relation to each other about a principal axis by means of at least one bearing interposed between the cups. The suspension bearing unit also comprises at least one seal made of thermoplastic material and of essentially annular form, the seal comprising a base molded in an essentially annular hollow housing provided on a face of a first element from among the lower and upper cups, the seal also comprising at least one sealing lip of essentially annular form extending from the base in order to come into sliding contact with a portion of the second element from among the upper and lower cups, the seal being adapted to protect the bearing from the ingress of water or polluting particles.

According to the invention, the hollow housing comprises a plurality of protruding ribs spaced apart circumferentially, the ribs protruding into the base of the seal.

The invention thus makes it possible to improve the integrity of the seal with the cup in order to ensure the sealing of the suspension bearing unit, and accordingly its reliability and its in-service life expectancy.

In fact, the molding of the one or more seals on the surfaces of the hollow housing of a cup creates a chemical bond ensuring the maintenance of the seal. The ribs protruding into the base of the seal molded in the hollow housing create a plurality of additional surfaces for additional chemical bonds between the seal and the lower cup.

In addition, the protruding ribs form surfaces that are oriented in an axial direction, thus forming means of abutment in rotation for the base of the seal in relation to the cup. In fact, in the event of the application of a high rotational torque by the cup to the at least one lip of the seal which comes into contact, the latter may deform in the direction of rotation and may cause the base to deform as a result. The protruding ribs make it possible to ensure that the base is maintained in position in its hollow housing, thereby preventing all rotation of the base in its housing.

Furthermore, the overall rigidity of the cup, and thus of the suspension bearing unit, is improved by these ribs ensuring stiffening of the hollow housing, in particular radially.

According to other advantageous, but not obligatory, characterizing features of the invention, taken in isolation or in combination:

The seal is made of thermoplastic material, in particular polyethylene PTE or polyurethane TPU.

The first element from among the upper and lower cups is made of plastic material, for example PA66 or PA6.

The lower cup comprises a hollow housing on a first face oriented axially towards the exterior of the suspension bearing unit.

The lower cup comprises a hollow housing on a second face oriented axially towards the interior of the suspension bearing unit.

The hollow housing comprises a cylindrical surface and a radial annular surface imparting an essentially parallelepidal axial cross-sectional form to the housing.

The ribs each extend between the cylindrical surface and the radial annular surface of the hollow housing.

The ribs are spaced apart at regular intervals circumferentially in the hollow housing.

The at least one sealing lip extending from the base of the seal comprises at least one preformed elbow between a first part of the lip extending as far as the base of the seal and a second part of the lip extending as far as a supporting extremity of the sealing lip on the second element.

The preformed elbow is set back towards the bearing.

The bearing is a plain bearing.

The bearing comprises at least one row of rolling elements interposed between two rings in relative rotation about the principal axis.

The bearing is an angular contact bearing.

The rolling elements are balls.

The rolling elements are kept spaced circumferentially at regular intervals by an annular cage.

The invention also relates to a support strut for a motor vehicle, comprising a shock absorber and a suspension bearing unit as mentioned above.

BRIEF DESCRIPTION OF THE DRAWINGS

The invention will be more readily appreciated from a perusal of the following description, which is given solely by way of non-restrictive example and is made with reference to the accompanying drawings, in which.

DETAILED DESCRIPTION OF THE PRESENT INVENTION

Figure 1:
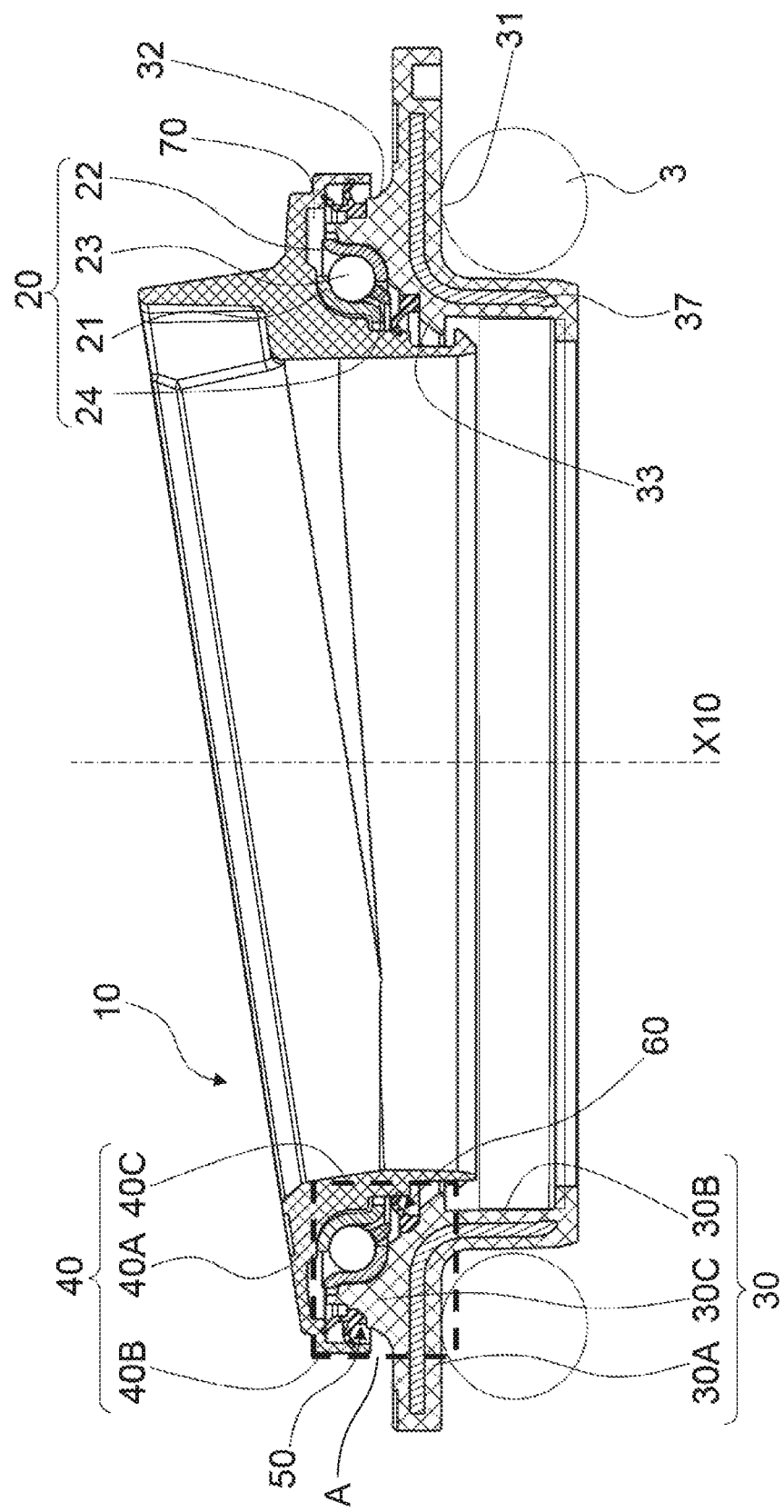
FIG. 1 presents a partial axial section of a suspension bearing unit according to the present invention.
Figure 2:
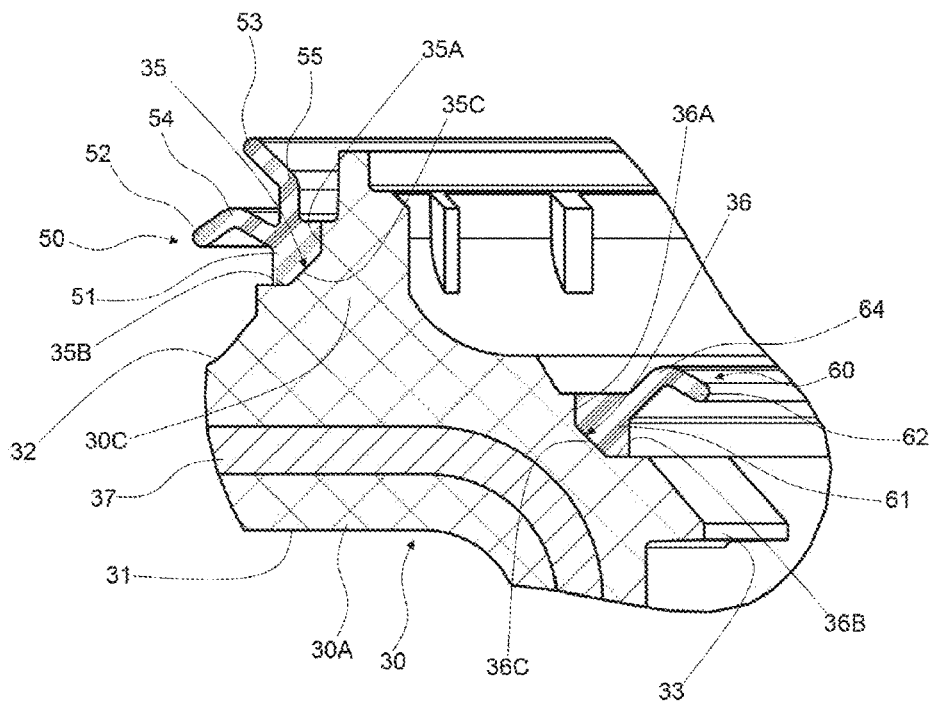
FIG. 2 is a section on a larger scale of the detail A in FIG. 1, depicting only the seal in its hollow housing on a lower cup of the suspension bearing unit.
Figure 3:
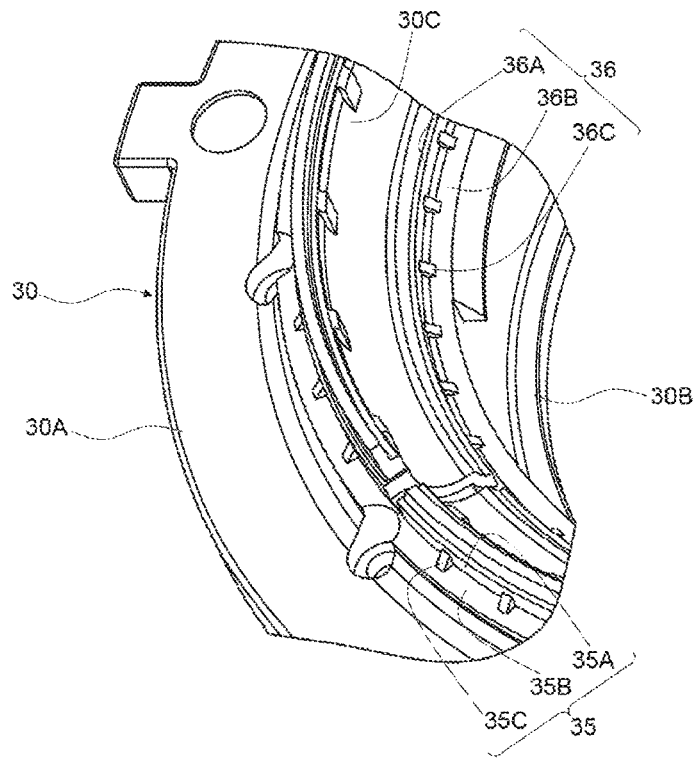
FIG. 3 is a view in perspective from above of a detail of the lower cup of the suspension bearing unit.

Represented in FIGS. 1 to 3 is a suspension bearing unit 10, adapted to equip a support strut (not represented here) integrated in a suspension system of a motor vehicle, in such a way as to support an axle and a wheel of a vehicle, not represented here with a view to simplification.

The suspension bearing unit 10 comprises a single angular contact bearing 20, a lower cup 30, an upper cup 40, an external seal 50 and an internal seal 60. The unit 10 and its constituent elements exhibit globally a form of revolution, about a central axis X10, when the suspension system of the vehicle is at rest. The cups 30 and 40 delimit between them an internal housing 70 of the unit 10, in which the bearing 20 and the seals 50 and 60 are housed.

The bearing 20 includes an internal ring 21, an external ring 22, as well as a row of rolling elements 23, in this case balls, in angular contact disposed between the rings 21 and 22, in a cage 24. The rings 21 and 22 are preferably metallic and are formed by pressing. Each of the rings 21 and 22 forms a raceway for the rolling elements 23 within the bearing 20. The bearing 20 is preferably an angular contact bearing in order to limit the internal forces and friction in the unit 10 in service.

As an alternative, the bearing may comprise a plurality of rows of rolling elements, and the rolling elements may be of some other type, for example rollers. As an alternative, the bearing may be a plain bearing. As an alternative, the unit may comprise a plurality of bearings.

The upper cup 40 is annular and comprises a middle part 40A, an external part 40B and an internal part 40C. The middle part 40A extends essentially radially and comprises a concave surface receiving the internal ring 21 of the bearing 20 with an inclined support. The external part 40B extends axially from the external edge of the middle part 40A in the direction of the lower cup 30. The internal part 40C extends axially from the internal edge of the middle part 40A in the direction of the lower cup 30.

The lower cup 30 is annular and comprises an axial part 30A, a radial part 30B, as well as a part 30C that is internal to the unit 10. The part 30A forms a hollow cylinder, the part 30B extending radially towards the exterior of the unit 10. The parts 30A and 30B together form an L, in the valley of which a supporting surface 31 of a suspension spring 3 is formed. The internal part 30C extends axially from the radial part 30B in the direction of the upper cup 40.

The lower cup 30 comprises a first face 32 oriented axially towards the exterior of the suspension bearing unit 10, and a second face 33 oriented axially towards the interior of the suspension bearing unit 10. The internal part 30C on the first external face 32 of the lower cup 30 is surrounded axially by the external part 40C of the upper cup 40. The internal part 30C on the second internal face 33 of the lower cup 30 surrounds the internal part 40B of the upper cup 40 axially.

The internal part 30C comprises a concave surface on the internal face 33 which receives the external ring 22 of the bearing 20 with an inclined support.

The lower cup 30 is also provided on its first external face 32 with a first essentially annular hollow housing 35 in which the first external seal 50 is installed. The hollow housing 35 includes a cylindrical surface 35A and a radial annular surface 35B imparting an essentially parallelepidal axial cross-sectional form to the housing 35. The housing 35 is open on the external face 32 of the lower cup 30.

The lower cup 30 is also provided on its second internal face 33 with a second essentially annular hollow housing 36 in which the second internal seal 60 is installed. The hollow housing 36 includes a cylindrical surface 36A and a radial annular surface 36B imparting an essentially parallelepidal axial cross-sectional form to the housing 36. The housing 36 is open on the internal face 33 of the lower cup 30.

The cups 30 and 40 are made of a plastic material, for example PA66 or PA6. Advantageously, the lower cup 30 may include an insert 37 made of a rigid material, for example metal, improving the rigidity of the cup and thus of the unit 10. According to an alternative, not represented here, the upper cup may also include a stiffening insert.

The suspension spring 3 is disposed supported between, on the one hand, of the lower side, the body of the piston shock absorber and, on the other hand, on the upper side, the supporting surface 31 of the lower cup 30 equipping the suspension bearing unit 10. The spring 3 is coiled around the axial part 30B and the axis X10. The spring 3 is elastically deformable depending on the stresses exerted on the suspension system of the vehicle. The spring 3 exerts axial forces, in an upper axial direction, against the cup 30, which transmits these forces to the unit 10. In the example in FIG. 1, the spring 3 is in direct contact with the cup 30, without an intermediate component. Alternatively, a shock absorber element may be interposed between the lower cup and the spring in such a way as to attenuate the vibrations.

The lower cup 30 and the upper cup 40 define the housing 70 in which the bearing 20 is installed. The housing 70 is defined radially between the external part 40B and the internal part 40C of the upper cup, and axially between the middle part 40A of the upper cup and the radial part 30B and the internal part 30C of the lower cup. The housing 70 is open on the one hand towards the exterior of the unit 10 between an edge of the external part 40B of the upper cup 40 and the axial part 30A of the lower cup 30, and on the other hand towards the interior of the unit 10 between an edge of the internal part 40C of the upper cup 40 and the radial part 30B of the lower cup 30. In order to ensure the sealing of the housing 70 in which the bearing 20 is installed, the external seal 50 and the internal seal 60 are installed between the cups 30 and 40 in immediate proximity to these openings in the housing 70 and in such a way as to frame the bearing 20.

The external seal 50 and the internal seal 60 are made of thermoplastic material, for example polyethylene PTE or polyurethane TPU, and are each of essentially annular form.

The external seal 50 comprises a base 51 molded in the essentially annular hollow housing 35 provided on the first external face 32 of the lower cup 30. The base 51 is of a form matching that of the hollow housing 35. More precisely, the base 51 is provided with a cylindrical surface of a form matching that of the cylindrical surface 35A of the hollow housing 35, and a radial annular surface of a form matching that of the radial annular surface 35B of the housing 35.

The external seal 50 also comprises two sealing lips 52 and 53 of essentially annular form and which extend from the base 51 towards the exterior of the unit 10 in order to come into sliding contact with an internal face of the external portion 40B of the upper cup 40. The two lips 52 and 53 each form a distinct angle of inclination with the base 51. In addition, each of the two sealing lips 52 and 53 comprises a preformed elbow 54 and 55, respectively, between a first lip part extending as far as the base 51 of the seal 50 and a second lip part extending as far as a supporting extremity of the sealing lip on the upper cup 40. A suchlike preformed elbow permits a certain flexibility to be imparted to the sealing lips, thereby permitting each of the lips to be in constant contact with the upper cup even in the case of heavy relative radial displacement between the lower and upper cups. Advantageously, the preformed elbows 54 and 55 are set back towards the bearing 20 in such a way as to prevent any peeling back of the lips, for example in the case of a jet of water at high pressure.

The internal seal 60 comprises a base 61 molded in the essentially annular hollow housing 36 provided on the second internal surface 33 of the lower cup 30. The base 61 is of a form matching that of the hollow housing 36. More precisely, the base 61 is provided with a cylindrical surface of a form matching that of the cylindrical surface 36A of the hollow housing 36, and a radial annular surface of a form matching that of the radial annular surface 36B of the housing 36.

The internal seal 60 also comprises a sealing lip 62 of essentially annular form and which extends from the base 61 towards the interior of the unit 10 in order to come into sliding contact with an internal surface of the internal portion 40C of the upper cup 40. The lip 62 forms an angle of inclination with the base 61. In addition, the sealing lip 62 comprises a preformed elbow 64 between a first lip part extending as far as the base 61 of the seal 60 and a second lip part extending as far as a supporting extremity of the sealing lip on the upper cup 40. Advantageously, the preformed elbow 64 is set back towards the bearing 20.

In accordance with the invention, each of the hollow housings 35 and 36 comprises a plurality of protruding ribs 35C and 36C, respectively, spaced apart circumferentially. The ribs 35C and 36C protrude into the bases 51 and 61 of the external seal 50 and the internal seal 60, respectively.

The ribs 35C of the external hollow housing 35 each extend between the cylindrical surface 35A and the radial annular surface 35B of the housing 35, and each define an essentially triangular form. In a similar manner, the ribs 36C of the internal hollow housing 36 each extend between the cylindrical surface 36A and the radial annular surface 36B of the housing 36, and each define an essentially triangular form.

Advantageously, the ribs 35C provided in the external hollow housing 35 are spaced apart at regular intervals circumferentially. In a similar manner, the ribs 36C provided in the internal hollow housing 36 are spaced apart at regular intervals circumferentially. As an alternative, the ribs are not spaced apart at regular intervals.

The external seal 50 is molded in the external hollow housing 35 of the lower cup 30. The base 51 of the seal 50 is thus formed in a manner matching the forms and surfaces of the hollow housing 35. The ribs 35C thus protrude into the interior and for the entire circumference of the base 51 of the seal 50. In a similar manner, the internal seal 60 is molded in the internal hollow housing 36 of the lower cup 30. The base 61 of the seal 60 is thus formed in a manner matching the forms and surfaces of the hollow housing 36. The ribs 36C thus protrude into the interior and for the entire circumference of the base 61 of the seal 60.

The molding of the seals 50 and 60 onto the surfaces 35A, 35B, 35C and 36A, 36B, 36C of the hollow housing 35 and 36, respectively, of the lower cup 30 creates a chemical bond ensuring the retention of the seal. The ribs 35C and 36C protruding into the base 51 and 61 of the seals 50 and 60, respectively, molded in the housing 35 and 36, respectively, create a plurality of additional surfaces for additional chemical bonds between the seals 50 and 60 and the lower cup 30.

The protruding ribs 35C and 36C form surfaces oriented in an axial direction, thus forming means of abutment in rotation for the bases 51 and 61 of the seals 50 and 60, respectively, in relation to the lower cup 30. In the event of the application of a high rotational torque by the upper cup 40 to the lips 52, 53 and/or 62 of the seals 50 and 60, respectively, which come into contact, the latter may deform in the direction of rotation and, as a result, may cause the bases 51 and/or 61 to deform, respectively. The protruding ribs 35C and 36C make it possible to ensure that the bases 51 and 61 are maintained in position in their hollow housings 35 and 36, respectively, thereby preventing all rotation of the bases in their housing.

The invention thus makes it possible to improve the integrity of the seals 50 and 60 with the lower cup 30 in order to ensure the sealing of the suspension bearing unit 10, and accordingly its reliability and its in-service life expectancy.

Furthermore, the overall rigidity of the lower cup 30, and accordingly of the suspension bearing unit 10, is improved by these ribs 35C and 36C, thereby ensuring stiffening of the hollow housing 35 and 36, in particular radially.

As an alternative to any of the preceding embodiments, only the hollow housing 35 on the first external face 32 of the lower cup 30 comprises a plurality of ribs 35C. As an alternative, only the hollow housing 36 on the second internal face 33 of the lower cup 30 comprises a plurality of ribs 36C.

The suspension bearing unit 10 illustrated in FIGS. 1 to 3 and described above comprises two external and internal seals. As an alternative, not represented here, the suspension bearing unit may comprise a single internal seal or external seal as described previously. The other seal may be replaced advantageously by a seal of the labyrinthine type or by any other appropriate means.

The suspension bearing unit 10 illustrated in FIGS. 1 to 3 and described above proposes the molding of the external and internal seals in the hollow housings provided in the lower cup. As an alternative, not represented here, at least one of the seals as described previously is molded in a hollow housing provided in the upper cup.

The external and/or internal seals may comprise, as an alternative, a single sealing lip or a plurality of sealing lips. The seal may also comprise, as an alternative, a first lip not coming into contact with the other cup and forming a first barrier of the labyrinthine type and a second lip coming into sliding contact with the cup.

Sealing lips with preformed elbows have been described above, although, as an alternative, the sealing lips may not exhibit suchlike preformed elbows.

In addition, the technical characterizing features of the different embodiments may, in totality and for only some of them, be combined with each other. The suspension bearing unit may thus be adapted in terms of costs, performance and simplicity of implementation.

What is claimed is:

1. A suspension bearing unit for a motor vehicle, comprising:
    an upper cup intended to be installed in an upper member integral with the body shell of the vehicle,
    a lower cup intended to form a supporting means for a suspension spring,
    a bearing interposed between the upper cup and the lower cup in rotation in relation to each other about a principal axis, and
    at least one seal made of thermoplastic material and of essentially annular form, the seal comprising a base molded in an essentially annular hollow housing provided on a face of a first element from among the lower and upper cups, the seal also comprising at least one sealing lip of essentially annular form extending from the base in order to come into sliding contact with a portion of the second element from among the upper and lower cups, the seal being adapted to protect the bearing from the ingress of water or polluting particles,
    wherein the hollow housing comprises a plurality of protruding ribs spaced apart circumferentially, the ribs protruding into the base of the seal.

2. The suspension bearing unit according to claim 1, wherein the seal made of thermoplastic material is made of one of polyethylene PTE or polyurethane TPU.

3. The suspension bearing unit according to claim 1, wherein the first element from among the upper cup and the lower cup is made of a plastic material.

4. The suspension bearing unit according to claim 1, the lower cup further comprising a hollow housing on a first face oriented axially towards the exterior of the suspension bearing unit.

5. The suspension bearing unit according to claim 1, the lower cup further comprising a hollow housing on a second face oriented axially towards the interior of the suspension bearing unit.

6. The suspension bearing unit according to claim 1, wherein the ribs each extend between a cylindrical surface and a radial annular surface of the hollow housing.

7. The suspension bearing unit according to claim 1, wherein the ribs are spaced apart at regular intervals circumferentially in the hollow housing.

8. The suspension bearing unit according to claim 1, the at least one sealing lip extending from the base of the seal further comprising at least one preformed elbow between a first part of the lip extending as far as the base of the seal and a second part of the lip extending as far as a supporting extremity of the sealing lip on the second element.

9. The suspension bearing unit according to claim 8, wherein the preformed elbow is set back towards the bearing.

* * * * *